(12) United States Patent
Kwon

(10) Patent No.: US 12,109,619 B2
(45) Date of Patent: Oct. 8, 2024

(54) METHOD OF MANUFACTURING COOLING PIPE FOR POWERTRAIN OF ELECTRIC VEHICLE AND COOLING PIPE MANUFACTURED THEREBY

(71) Applicant: PUKYONG NATIONAL UNIVERSITY INDUSTRY-UNIVERSITY COOPERATION FOUNDATION, Busan (KR)

(72) Inventor: Hansang Kwon, Busan (KR)

(73) Assignee: Pukyong National University Industry-University Cooperation Foundation, Busan (KR)

(*) Notice: Subject to any disclaimer, the term of this patent is extended or adjusted under 35 U.S.C. 154(b) by 854 days.

(21) Appl. No.: 16/909,650

(22) Filed: Jun. 23, 2020

(65) Prior Publication Data
US 2021/0331238 A1 Oct. 28, 2021

(30) Foreign Application Priority Data
Apr. 22, 2020 (KR) ........................ 10-2020-0048679

(51) Int. Cl.
*B22F 3/20* (2006.01)
*B22F 9/04* (2006.01)
(Continued)

(52) U.S. Cl.
CPC ................. *B22F 3/20* (2013.01); *B22F 9/04* (2013.01); *H01M 10/613* (2015.04);
(Continued)

(58) Field of Classification Search
CPC ........ B22F 3/20; B22F 9/04; B22F 2009/043; B22F 2301/052; B22F 2302/403;
(Continued)

(56) References Cited

U.S. PATENT DOCUMENTS

2019/0386260 A1   12/2019   Xie

FOREIGN PATENT DOCUMENTS

| JP | 2006315893 A | * | 11/2006 | |
| KR | 101822073 B1 | * | 1/2018 | ........... B21C 23/001 |
| KR | 10-2018-0079974 A | | 7/2018 | |

* cited by examiner

*Primary Examiner* — Anthony M Liang
*Assistant Examiner* — Danny N Kang
(74) *Attorney, Agent, or Firm* — Knobbe, Martens, Olson & Bear, LLP

(57) ABSTRACT

This application relates to a method of manufacturing a cooling pipe for a powertrain of an electric vehicle. The method may include preparing a powdered composite material by ball-milling aluminum alloy particles and carbon nanotube particles. The method may also include preparing a multilayer billet containing the powdered composite material and comprising a core layer and two or more shell layers surrounding the core layer. The method may further include extruding the multilayer billet to produce a pipe-shaped extrusion. The core layer is made of the powdered composite material or an aluminum alloy, the outermost shell layer of the two or more shell layers is made of an aluminum alloy, and the remaining shell layers are made of an aluminum alloy. This application also relates to a cooling pipe manufactured by the method, an electric vehicle motor and an electric vehicle battery pack casing including the cooling pipe.

7 Claims, 8 Drawing Sheets

(51) Int. Cl.
*H01M 10/613* (2014.01)
*H01M 10/6568* (2014.01)

(52) U.S. Cl.
CPC ... *H01M 10/6568* (2015.04); *B22F 2009/043* (2013.01); *B22F 2301/052* (2013.01); *B22F 2302/403* (2013.01)

(58) Field of Classification Search
CPC ...... B22F 2007/042; B22F 5/08; B22F 5/085; B22F 5/10; B22F 7/064; B22F 2003/1051; B22F 2207/01; B22F 2998/10; B22F 2999/00; H01M 10/613; H01M 10/6568; H01M 2220/20; H01M 10/625; H01M 10/6556; C22C 2026/002; C22C 1/0416; C22C 1/05; Y02E 60/10
See application file for complete search history.

METHOD OF MANUFACTURING COOLING PIPE FOR POWERTRAIN OF ELECTRIC VEHICLE AND COOLING PIPE MANUFACTURED THEREBY

CROSS REFERENCE TO RELATED APPLICATION

The present application claims priority to Korean Patent Application No. 10-2020-0048679, filed Apr. 22, 2020, the entire contents of which is incorporated herein for all purposes by this reference.

BACKGROUND

1. Field

The described technology relates to a method of manufacturing a cooling pipe for an electric vehicle powertrain such as a motor and a battery pack, and to a cooling pipe manufactured thereby.

2. Description of the Related Technology

Regarding electric motors and batteries which are the core components of a powertrain of an electric vehicle, there are issues caused by excessively increased temperatures during driving. For example, the increased temperatures are likely to end with a fire or a reduction in driving distance attributable to deterioration of driving efficiency.

In particular, a high-voltage battery pack that is repeatedly charged and discharged to provide driving power to an electric motor during driving of a vehicle suffers an increase in temperature due to heat generation arising from the charging and discharging. The temperature rise results in deterioration in operation performance and a shortened life of the battery pack, or even results in a fire in an extreme case.

Most of the existing cooling tubes for motors and battery packs of electric vehicles are made of stainless steel or copper alloy. They each have advantages and disadvantages. Stainless steel tubes are advantageous in terms of high corrosion resistance and good mechanical properties but are disadvantageous in terms of low density and low thermal conductivity which respectively result in a heavy weight and low cooling efficiency. On the other hand, cooper alloy tubes are advantages in terms of high thermal conductivity but are disadvantageous in that they are expensive, heavy, and poor in adhesion to aluminum due to a big difference in coefficient of thermal expansion between copper and aluminum. In addition, it is known that stainless steel and copper alloy are both inherently poor in wettability with respect to aluminum, which results in poor heat transfer efficiency.

SUMMARY

The present invention has been made in view of the problems occurring in the related art and an objective of the present invention is to provide a method of manufacturing a cooling pipe with improved heat transfer efficiency, the cooling pipe being capable of cooling a powertrain of an electric vehicle powertrain with improved cooling efficiency, and to provide a cooling pipe for a powertrain of an electric vehicle.

In order to achieve one objective of the present invention, according to one aspect of the present invention, there is provided a method of manufacturing a cooling pipe for a powertrain of an electric vehicle, the method including: (a) preparing a powdered composite material by ball-milling an aluminum alloy powder and a carbon nanotube (CNT) powder; (b) preparing a multilayer billet including a core layer and two or more shell layers surrounding the core layer, in which the core layer is made of the powdered composite material or an aluminum alloy, the outermost shell layer of the two or more shell layers is made of an aluminum alloy, and the remaining shell layers are made of the powdered composite material; and (c) extruding the multilayer billet to produce a pipe-shaped extrusion.

According to one embodiment, the core layer may be made of the powdered composite material. In addition, the powdered composite material of the core layer and each of the powdered composite materials of the respective shell layers except for the outermost shell layer differ in composition.

According to one embodiment, the multilayer billet may be composed of layers including a core layer, a first shell layer surrounding the core layer, and a second shell layer surrounding the first shell layer.

According to one embodiment, the multilayer billet may include a first billet that has a can shape and serves as the second shell layer, a second billet that is disposed inside the first billet and serves as the first shell layer; and a third billet disposed inside the second billet and serves as the core layer.

According to one embodiment, in the preparing of the multilayer billet, spark plasma sintering may be performed on the multilayer billet under a pressure of 30 MPa to 100 MPa at a temperature of 280° C. to 600° C. for a period of 1 second to 30 minutes.

According to one embodiment, in the extruding of the multilayer billet, the produced pipe-shaped extrusion may have an embossed surface composed of protrusions and recesses that extend linearly along a lengthwise direction or extend spirally in a circumferential direction.

According to one embodiment, in the extruding of the multilayer billet, the multilayer billet may be extruded through an indirect extrusion process, a direct extrusion process, a hydrostatic extrusion process, or an impact extrusion process.

According to another aspect of the present invention, there is provided a cooling pipe for a powertrain of an electric vehicle, the cooling pipe being manufactured through the method that is described above.

According to a further aspect of the present invention, there is provided a motor and a battery back casing each of which is equipped with a cooling unit including the cooling pipe.

The cooling pipe for cooling an electric vehicle powertrain including a motor and a battery pack during driving of the electric vehicle is made from a carbon nanotube-reinforced aluminum composite based on an aluminum alloy belonging to the same series as the material of the motor and the casing of the battery pack. Therefore, the interfacial adhesion between the cooling pipe and the powertrain is improved, resulting in improved heat transfer efficiency. In addition, since the cooling pipe is made from a material containing carbon nanotubes that are about 30 times as high in thermal conductivity as monolithic aluminum, the cooling pipe has improved heat transfer efficiency and cooling efficiency.

DETAILED DESCRIPTION

In the following description, when it is determined that the detailed description of known functions or configurations related to the present invention is likely to obscure the subject matter of the invention, the detailed description will be omitted.

Reference will now be made in greater detail to specific embodiments of the present invention, wherein the specific embodiments may be modified in a variety of other forms. However, it should be understood that the present invention is not limited to the specific embodiments, but encompasses all of modifications, equivalents, and substitutes which fall within the spirit and technical scope of the claimed invention.

The terminology used herein is for the purpose of describing particular embodiments only and is not intended to limit the claimed invention. As used herein, the singular forms "a", "an", and "the" are intended to include the plural forms as well, unless the context clearly indicates otherwise. It will be further understood that the terms "comprises" and/or "comprising," or "includes" and/or "including," or "has" and/or "having" when used in this specification, specify the presence of stated features, regions, integers, steps, operations, elements and/or components, but do not preclude the presence or addition of one or more other features, regions, integers, steps, operations, elements, components and/or groups thereof.

Hereinafter, the present invention will be described in detail.

Figure 1:
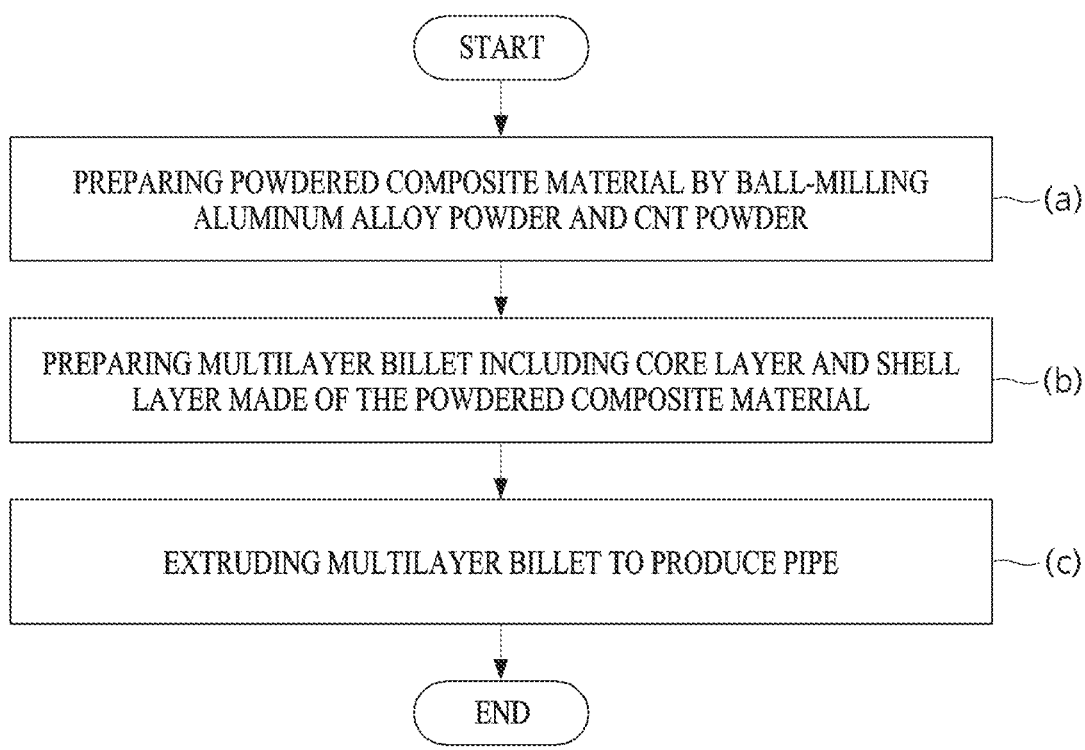
FIG. 1 is a process flow diagram of a manufacturing method of a cooling pipe for a powertrain of an electric vehicle, according to one embodiment of the present invention.

A method of manufacturing a cooling pipe for a powertrain of an electric vehicle, according to one embodiment of the present invention, includes: (a) preparing a powdered composite material by ball-milling an aluminum alloy powder and a carbon nanotube powder, (b) preparing a multilayer billet containing the powdered composite material and composed of a core layer and two or more shell layers surrounding the core layer, in which the core layer is made of the powdered composite material or an aluminum alloy, the outermost shell layer of the two or more shell layers is made of an aluminum alloy, and the remaining shell layers are made of the powdered composite material; and (c) extruding the multilayer billet to produce a pipe-shaped extrusion (see FIG. 1).

In the step (a), the aluminum alloy powder is prepared from any one selected from the group consisting of aluminum alloys of 1000 series, 2000 series, 3000 series, 4000 series, 5000 series, 6000 series, 7000 series and 8000.

Since the powdered composite material contains carbon nanotubes (CNT), when a composite material product such as a cladding is manufactured from a billet made of the powered composite material through plastic working such as extrusion, rolling, and forging, the composite material product provide advantages such as high thermal conductivity, high strength, and lightness.

However, nano-scale carbon nanotube particles are difficult to disperse in micro-scale aluminum alloy particles due to a large difference in particle size therebetween, and carbon nanotube (CNT) particles are easy to agglomerate due to their strong van der Waals force. Therefore, a dispersant may need to be added to uniformly disperse CNT particles in aluminum alloy particles.

An example of the dispersant is a powder of nano-scale ceramic particles prepared from any ceramic material selected from the group consisting of $SiO_2$, $Al_2O_3$, $TiO_2$, $Fe_3O_4$, MgO, $ZrO_2$, and mixtures thereof.

The nano-scale ceramic particles uniformly disperse CNT particles in aluminum alloy particles. Particularly, nano-scale silicon carbide (SiC) particles have high tensile strength, high sharpness, high electrical conductivity, and high thermal conductivity. In addition, the nano-scale SiC particles have high hardness, high heat resistance, and high thermal shock resistance and are thermally and chemically stable. Due to such advantages, SiC is commonly used as an abrasive or a refractory material. The nano-scale SiC particles present on the surface of aluminum alloy particles prevent CNT particles from coming into direct contact with the aluminum alloy particles, thereby inhibiting formation of undesirable aluminum carbide which frequently results from reaction between CNT particles and aluminum alloys on the surface of the aluminum alloy particles.

According to one embodiment of the present invention, the powdered composite material contains 100 parts by volume of aluminum alloy particles, and 0.01 to 10 parts by volume of CNT particles.

When the content of the CNT particles in the powdered composite material is less than 0.01 part by volume with respect to 100 parts by volume of the aluminum alloy particles, the powdered composite material exhibits similar strength to monolithic aluminum or aluminum alloy. That is, the reinforcing effect of the CNT particles is not significant in the powdered composite material. On the contrary, when the content of the CNT particles is more than 10 parts by volume with respect to 100 parts by volume of the aluminum alloy particles, the powdered composite material has improved strength compared to monolithic aluminum or aluminum alloy but exhibits poorer elongation. Specifically, in a case where the content of the CNT particles in the powdered composite is more than necessary, the CNT particles are rather difficult to disperse, resulting in deterioration in mechanical properties of the powdered composite material.

When a dispersant is added to the powdered composite material, the content of the dispersant in the powdered composite material is 0.1 to 10 parts by volume with respect to 100 parts by volume of the aluminum alloy particles.

When the content of the dispersant is less than 0.1 part by volume with respect to 100 parts by volume of the aluminum alloy particles, the effect of inducing dispersion is insignificant. On the other hand, when the content exceeds 10 parts by volume, strong agglomeration of the carbon nanotubes occurs. That is, the dispersion of the carbon nanotubes is rather inhibited.

The ball-milling is specifically performed in an air atmosphere or an inert gas atmosphere. Specifically, the ball-milling may be performed in a nitrogen or argon atmosphere. The balling-milling may be performed a low speed of 150 r/min to 300 r/min or a high speed of 300 r/min or higher. The time duration of the ball-milling is preferably in a range of 12 hours to 48 hours. In this process, a horizontal ball mill or a planetary ball mill is used.

The ball mill consists of a stainless steel container and two different-diameter stainless steel balls loaded in the stainless steel container. The stainless steel balls are a mixture of balls having a diameter of 20 mm ($\Phi$=20 mm) and balls having a diameter of 10 mm ($\Phi$=10 mm). The balls with a diameter of 20 mm and the balls with a diameter of 10 mm are mixed at a ratio of 1:1. The amount of the stainless steel balls in the container is in a range of 100 parts by volume to 1500 parts by volume with respect to 100 parts by volume of the powdered composite material to be produced.

In addition, a process control agent is introduced into the container to reduce the friction coefficients. The process control agent is any one organic solvent selected from the group consisting of heptane, hexane, and alcohol. The content of the process control agent is 10 to 50 parts by volume with respect to 100 parts by volume of the powdered composite material. The organic solvent is completely degassed through a hood when the container is uncovered. Since the organic solvent is removed, only a mixture of the aluminum alloy powder and the carbon nanotube (CNT) powder remains.

The nano-scale ceramic particles serving as the dispersant act like nano-scale milling balls during the ball milling process. The nano-scale ceramic particles separate the physically agglomerated CNT particles from each other and promote flowability of the CNT particles. Therefore, the CNT particles can be more uniformly dispersed on the surfaces of the aluminum particles.

Next, in the step (b), the multilayer billet containing the powdered composite material obtained in the previous step (step (a)) is prepared.

The multilayer billet manufactured in this step includes a core layer and two or more shell layers surrounding the core layer. The core layer is made of the powdered composite material or an aluminum alloy. The outermost shell layer of the two or more shell layers is made of an aluminum alloy. The remaining shell layers except for the outermost shell layer are made of the powdered composite material.

When the number of the shell layers excluding the outermost shell layer is two or more, it is preferable that the powdered composite materials of the respective shell layers differ in their composition. Herein, the term "composition" refers to a content ratio of aluminum alloy and carbon nanotube contained in each of the shell layers in terms of volume fractions.

In addition, when the core layer is made of the powdered composite material, the composition of the powdered composite material of the core layer also differs from that of each of the shell layers.

The number of the shell layers included in the multilayer billet is not particularly limited, but the number is preferably not greater than five in terms of cost efficiency.

Figure 2:
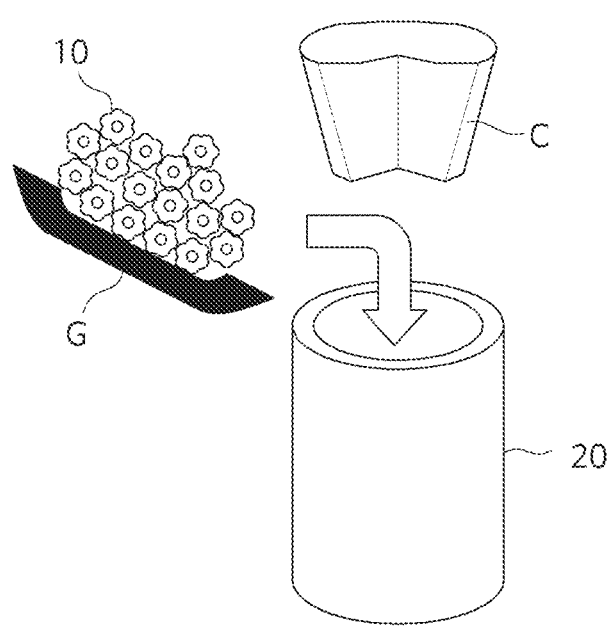
FIG. 2 is a schematic diagram illustrating a method of preparing a multilayer billet from which the cooling pipe is made.

FIG. 2 is a diagram schematically illustrating an exemplary process of preparing a multilayer billet.

Referring to FIG. 2, the multilayer billet is prepared by pouring the powdered composite material 10 described above into a can-shaped metal container 20 through a guider G, and sealing the can-shaped metal container 20 with a cap C to prevent the powdered composite material from flowing out of the metal container 20.

The metal container 20 can be made of any material that is thermally and electrically conductive. For example, the metal container 20 is preferably made of aluminum, any aluminum alloy, copper, or magnesium. The thickness of the metal container 20 is preferably in a range of 0.5 mm to 150 mm when a 6-inch billet is produced. The thickness may vary depending on the size of the billet to be produced.

Figure 3:
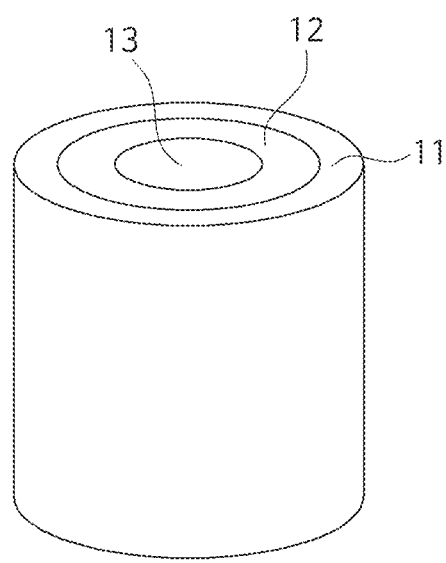
FIG. 3 is a schematic diagram illustrating an example of a multilayer billet from which a cooling pipe for a powertrain of an electric vehicle is made, according to one embodiment of the present invention.
Figure 4:
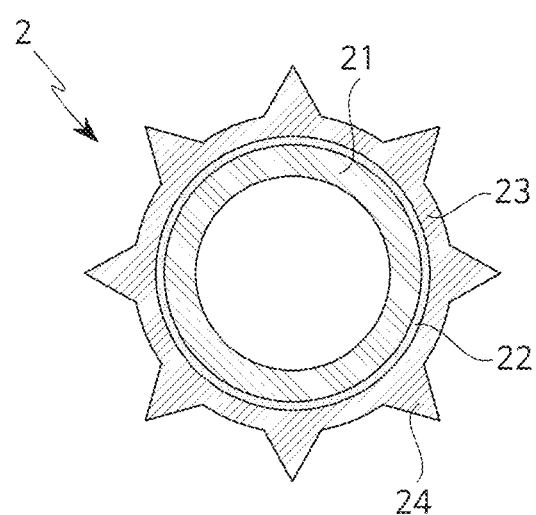
FIG. 4 is a cross-sectional view illustrating a cooling pipe for a powertrain of an electric vehicle, the cooling pipe being manufactured through the method according to the present invention, in which the cooling pipe has an embossed surface with protrusions extending in a circumferential direction.
Figure 5:
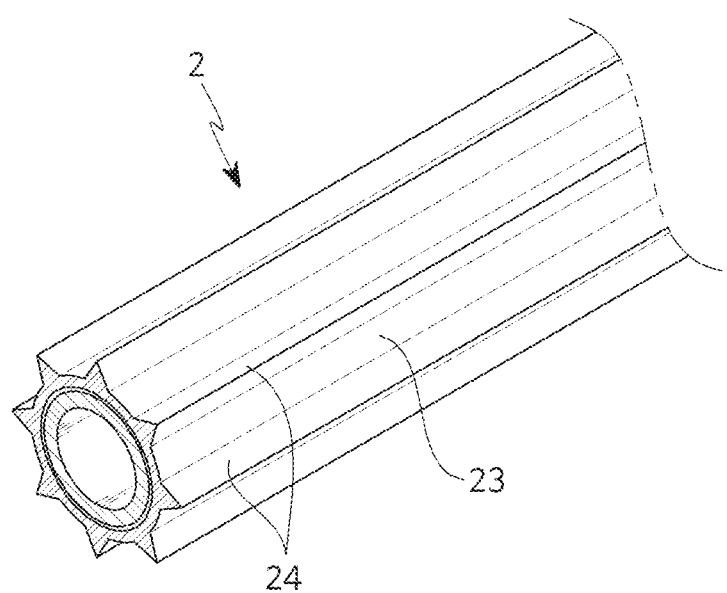
FIG. 5 is a perspective view illustrating a cooling pipe for a powertrain of an electric vehicle, the cooling pipe being manufactured through the method according to embodiments of the present invention, in which the cooling pipe has an embossed surface with protrusions linearly extending in a lengthwise direction.
Figure 6:
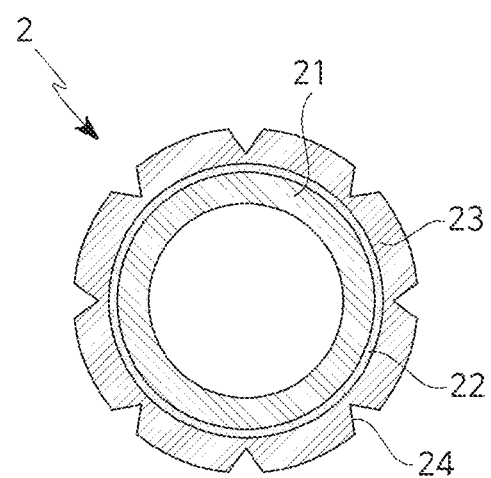
FIG. 6 is a cross-sectional view illustrating a cooling pipe for a powertrain of an electric vehicle, the cooling pipe being manufactured through the method according to embodiments of the present invention, in which the cooling pipe has an embossed surface with recesses extending in a circumferential direction.
Figure 7:
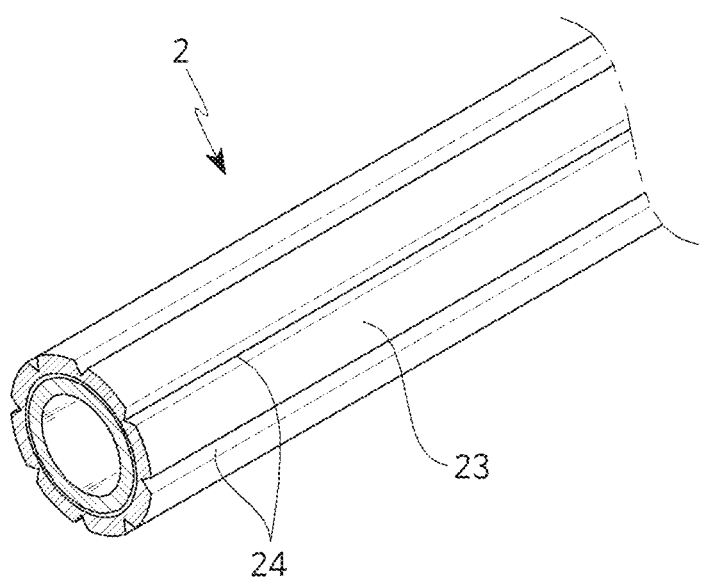
FIG. 7 is a perspective view illustrating a cooling pipe for a powertrain of an electric vehicle, the cooling pipe being manufactured through the method according to embodiments of the present invention, in which the cooling pipe has an embossed surface with recesses linearly extending in a lengthwise direction.

FIG. 3 is a perspective view illustrating an exemplary multilayer billet that is prepared through the method described above. The multilayer billet is composed of a core layer and two shell layers surrounding the core layer. Specifically, the two shell layers include a first shell layer surrounding the core layer and a second shell layer surrounding the first shell layer.

That is, referring to FIG. 3, the multilayer billet includes a first billet 11 that has a hollow cylinder shape and is referred to as the second shell layer, a second billet 12 that is referred to as the first shell layer and disposed inside the first billet 11, and a third billet 13 that is referred to as the core layer and disposed inside the second billet 12. The second billet 12 has a different composition from the first billet 11, and the third billet 13 has a different composition from the second billet 12.

The first billet 11 is in the form of a hollow cylinder with one closed end. That is, the first billet 11 is a one-end closed can. Alternatively, the first billet 11 may be in the form of a hollow cylinder with both ends closed. The first billet 11 is made of a metal such as aluminum, copper, or magnesium. The first billet 11 is prepared by heating a base metal to be melted and pouring the resulting molten metal into a cast. Alternatively, the first billet 11 may be prepared through machining.

The second billet 12 contains the powdered composite material prepared through the method described above. The second billet 12 is in the form of a bulk alloy (or metal) or a powder compact.

The second billet 12 is a bulk alloy (or metal) having a hollow cylinder shape. In this case, the multilayer billet is formed by placing the cylinder-shaped second billet 12 in the first billet 11. The placing of the second billet 12 in the first billet 11 involves a step of melting the powdered composite material, a step of pouring the resulting molten composite material into a die to produce a composite material cylinder, and a step of inserting the composite material cylinder into the cavity of the first billet 11. Alternatively, the placing of the second billet 12 may be performed through a method of packing the powdered composite material into the cavity of the first billet 11.

The third billet 13 is in the form of a bulk alloy (or metal) or a powder compact.

The second billet 12 or the third billet 13 is a bulk alloy (or metal), the second billet 12 or the third billet 12 may be prepared by compacting the powdered composite material under high pressure or sintering the powdered composite material.

The composition of the powdered composite material contained in the second billet 12 is different from the composition of the powdered composite material contained in the third billet 13. For example, when each of the powdered composite materials from which the second billet 12 and the third billet 13 are respectively made is composed of aluminum (or aluminum alloy) particles and CNT particles, the powdered composite material of the second billet 12 contains 0.09 to 10 parts by volume of the CNT particles with respect to 100 parts by volume of the aluminum (or aluminum alloy) particles, and the powdered composite material of the third billet 13 contains 0 to 0.08 part by volume of the CNT particles with respect to 100 parts by volume of the aluminum (or aluminum alloy) particles.

Alternatively, the second billet 12 may be made from the powdered composite material, and the third billet 13 may be a bulk metallic body made of or a bulk alloy based on a metal selected from the group consisting of aluminum, copper, magnesium, titanium, stainless steel, tungsten, cobalt, nickel, and tin.

In the multilayer billet, the second billet 12 accounts for 0.01% to 10% by volume, the third billet 13 accounts for 0.01% to 10% by volume, and the first billet 11 accounts for the remainder.

Since the multilayer billet includes the second billet 12 or the third billet 13 containing the powdered composite material, the multilayer billet is compressed at a high pressure of 10 MPa to 100 MPa before being sealed.

The multilayer billet transforms through the compression step such that it can be extruded through an extrusion die. When the compression is performed at a pressure lower than 10 MPa, the plastic-worked semi-finished product of the powdered composite material is likely to have many pores, or the powdered composite material is likely to flow during the plastic working. On the other hand, when the pressure for the compression exceeds 100 MPa, the second billet (which does not mean only the second billet but means the second and the onwards) is likely to be deformed due to expansion caused by the excessively high pressure.

In addition, since the multilayer billet includes the second billet and/or the third billet containing the powdered composite material, the multilayer billet is sintered before being supplied to a plastic working process such as extrusion.

For the sintering, a spark plasma sintering apparatus or a hot pressure sintering apparatus may be used, but the apparatus for the sintering is not limited thereto. Any sintering apparatus can be utilized for the same purpose (i.e., sintering). In a case where precise sintering within a short time is required, it is preferable to use the spark plasma sintering apparatus. The spark plasma sintering may be performed under a pressure of 30 MPa to 100 MPa at a temperature of 280° C. to 600° C. for 1 second to 30 minutes.

Subsequently, in the step (c), the multilayer billet is extruded to produce a pipe-shaped extrusion containing a two-component composite material of aluminum and carbon nanotube.

The pipe-shaped extrusion may have an even surface or an embossed surface in which protrusions and recesses may have various cross-sectional shapes such as triangles, squares, and semicircles.

In a case that the extrusion has an embossed surface, the contact area between a cooling pipe prepared from the extrusion and a vehicle powertrain is increased compared to a case where the cooling pipe has an even surface, and the adhesion between the cooling pipe and the electric vehicle power train is improved. Therefore, the cooling efficiency is improved.

Referring to FIGS. 4 through 7, an extrusion is produced from the multilayer billet through the step (c). The extrusion includes an aluminum alloy layer 21 originated in the core layer of the multilayer billet, an alloy-CNT composite layer 22 originated in the first shell layer of the multilayer billet, and an aluminum alloy layer 23 originated in the second shell layer of the multilayer billet. The surface of the aluminum alloy layer 23 originated in the second shell layer of the multilayer billet is an embossed surface with linear protrusions and linear recesses extending in a lengthwise direction of the extrusion (i.e., cooling pipe).

Figure 8:
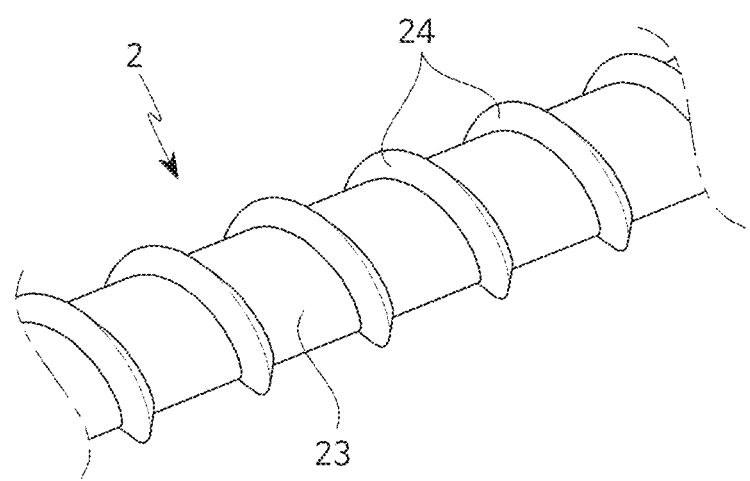
FIG. 8 is a perspective view illustrating a cooling pipe for a powertrain of an electric vehicle, the cooling pipe being manufactured through the method according to embodiments of the present invention, in which the cooling pipe has an embossed surface with protrusions spirally extending in a circumferential direction.

Alternatively, as illustrated in FIG. 8, the protrusions and the recesses in the embossed surface spirally extend.

In the step (c), the extrusion technique is not specifically limited. For example, an indirect extrusion process, a direct extrusion process, a hydrostatic extrusion process, or an impact extrusion process is used.

The cooling pipe made of the CNT-reinforced aluminum alloy composite material manufactured according to embodiments of the method of the present invention provides advantages when used to cool a powertrain of an electric vehicle: first, since the cooling pipe is made of a composite material based on the same type of aluminum alloy as that of a motor and a battery pack casing, the interfacial adhesion between the cooling pipe and the motor and between the cooling pipe and the battery pack casing is improved, resulting in improved heat transfer efficiency; and second, since the composite material of the cooling pipe contains carbon nanotubes having a thermal conductivity of about 30 times as high as aluminum, the heat transfer efficiency can be economically improved.

Herein below, the present invention will be described in greater detail with reference to specific examples. The examples described herein may be modified in a variety of other forms, and those skilled in the art will appreciate that the present invention is not limited to the specific examples, but encompasses all of modifications, equivalents, and substitutes which fall within the spirit and technical scope of the claimed invention. The specific examples are provided to make the disclosure of the present invention thorough and complete and to fully convey the concept of the invention to those skilled in the art.

Examples

Carbon nanotubes (CNTs) that were used have a purity of 99.5, diameters of 10 nm or less, and lengths of 10 nm or less. The carbon nanotubes waver obtained from OCSiAl which 15 is a global nanotechnology company headquartered in Luxembourg. Aluminum powder that was used has an average particle size of 45 μm and a purity of 99.8%. The aluminum powder was obtained from MetalPlayer Co., Ltd in Korea.

A multi-layer billet was manufactured such that a cylinder-shaped third billet was positioned at the center of an aluminum alloy can which is referred to as a first billet, and a second billet which is made of a powdered composite material was positioned between the first billet and the third billet.

The second billet is prepared from a powdered aluminum-CNT composite material containing 0.1 parts by volume of the carbon nanotubes with respect to 100 parts by volume of the aluminum powder. The first billet was made of 6063 aluminum, and the third billet was made of 3003 aluminum.

The second billet was specifically prepared through a method described below. The particles of the aluminum powder and the particles of the carbon nanotubes were loaded into a stainless steel container in a ratio of 100 parts by volume of the aluminum powder and the 0.1 part by volume of the carbon nanotubes. The mixture of the aluminum powder and the carbon nanotubes introduced into the stainless steel container accounted for 30% of the total volume of the stainless steel container. Next, stainless steel balls including 20 mm balls and 10 mm balls were introduced into the stainless steel container to occupy another 30% of the total volume the stainless steel container, and 50 ml heptane was introduced into the container. The resulting mixture was ball-milled at a low speed of 250 rpm for 24 hours. For the ball milling, a horizontal ball mill was used. Next, the container was uncovered so that the heptane was degassed through a hood, and a powdered aluminum-CNT composite material was recovered.

The prepared powdered aluminum-CNT composite material was poured into a gap of 2.5t between the first billet and the third billet, and compressed at a pressure of 100 MPa to prepare a multilayer billet.

Next, the prepared multilayer billet was directly extruded with a direct extruder under the conditions of an extrusion ratio of 100, an extrusion rate of 5 mm/s, an extrusion pressure of 200 kg/cm$^2$, and a billet temperature of 460° C. to produce a pipe-shaped extrusion.

Specific embodiments of the present invention have been described above with reference to the accompanying drawings, but those ordinarily skilled in the art will appreciate that the present invention can be implemented in other forms without departing from the technical spirit or essential features of the present invention. Therefore, it should be understood that the embodiments described above are illustrative in all respects and are not restrictive.

What is claimed is:

1. A method of manufacturing a cooling pipe for a powertrain of an electric vehicle, the method comprising:
    preparing a powdered composite material by ball-milling aluminum alloy particles and carbon nanotube particles;
    preparing a multilayer billet containing the powdered composite material, wherein the multilayer billet comprises:
        a can-shaped first billet serving as a second shell layer,
        a second billet disposed inside the can-shaped first billet and serving as a first shell layer, and
        a third billet disposed inside the second billet and serving as a core layer,
    wherein the first billet is made of aluminum,
    wherein the second billet and the third billet comprise the powdered composite material, and
    wherein the second billet comprises 0.09 to 10 parts by volume of the carbon nanotube particles with respect to 100 parts by volume of the aluminum alloy particles, and the third billet comprises 0.08 part by volume of the carbon nanotube particles with respect to 100 parts by volume of the aluminum alloy particles; and
    extruding the multilayer billet to prepare a pipe-shaped extrusion.

2. The method according to claim 1, wherein preparing the multilayer billet comprises performing a spark plasma sintering process on the multilayer billet under a pressure of 30 MPa to 100 MPa at a temperature of 280° C. to 600° C. for 1 second to 30 minutes.

3. The method according to claim 1, wherein the pipe-shaped extrusion comprises an embossed surface with protrusions and recesses that extend linearly in a lengthwise direction of the pipe-shaped extrusion or are spirally wound in a circumferential direction of the pipe-shaped extrusion.

4. The method according to claim 1, wherein extruding the multilayer billet comprises performing an indirect extrusion process, a direct extrusion process, a hydrostatic extrusion process, or an impact extrusion process on the multilayer billet.

5. A cooling pipe for a power train of an electric vehicle, the cooling pipe manufactured by the method according to claim 1.

6. A motor for an electric vehicle, the motor comprising the cooling pipe according to claim 5.

7. A battery pack casing for an electric vehicle, the casing comprising the cooling pipe according to claim 5.

* * * * *